(12) United States Patent
Ward et al.

(10) Patent No.: US 8,635,177 B2
(45) Date of Patent: Jan. 21, 2014

(54) RULE-BASED BINDING

(75) Inventors: Trevor H. Ward, Kars (CA); Keith Rolland McLellan, Ottawa (CA); Gilles Maurice, Ottawa (CA)

(73) Assignee: Adobe Systems Incorporated, San Jose, CA (US)

(*) Notice: Subject to any disclaimer, the term of this patent is extended or adjusted under 35 U.S.C. 154(b) by 1192 days.

(21) Appl. No.: 12/542,576

(22) Filed: Aug. 17, 2009

(65) Prior Publication Data

US 2013/0185240 A1 Jul. 18, 2013

(51) Int. Cl.
*G06F 17/00* (2006.01)

(52) U.S. Cl.
USPC .............................................. 706/47; 717/105

(58) Field of Classification Search
None
See application file for complete search history.

(56) References Cited

U.S. PATENT DOCUMENTS

| | | | | |
|---|---|---|---|---|
| 5,367,619 A | * | 11/1994 | Dipaolo et al. | 715/221 |
| 6,460,141 B1 | * | 10/2002 | Olden | 726/4 |
| 2002/0138577 A1 | * | 9/2002 | Teng et al. | 709/205 |
| 2002/0184610 A1 | * | 12/2002 | Chong et al. | 717/109 |
| 2006/0271390 A1 | * | 11/2006 | Rich et al. | 705/1 |
| 2008/0103786 A1 | * | 5/2008 | Zhang et al. | 705/1 |
| 2009/0049422 A1 | * | 2/2009 | Hage et al. | 717/104 |
| 2010/0042973 A1 | * | 2/2010 | Anderson et al. | 717/120 |
| 2011/0016074 A1 | * | 1/2011 | Berg et al. | 706/47 |

OTHER PUBLICATIONS

IBM, "Rational Business Developer—Overview" [online], (retrieved on Jul. 16, 2009). Retrieved from the Internet: <URL: http://www-01.ibm.com/software/awdtools/developer/business/>, 2 pages.

* cited by examiner

*Primary Examiner* — Jeffrey A Gaffin
*Assistant Examiner* — David H Kim
(74) *Attorney, Agent, or Firm* — Finch & Maloney PLLC

(57) ABSTRACT

Methods, systems, and apparatus, including computer programs encoded on a computer storage medium, for rule-based binding. In one aspect, a method includes receiving first input to a graphical user interface (GUI) associating a property of a data model presented in the GUI with a data view component of a document presented in the GUI, wherein a change to a value of the data view component is reflected in a value of the property in the data model when the document is used in a workflow, and wherein the workflow is a logical sequence of documents, including the document, that is processed according to the logical sequence such that values for one or more data view components associated with the documents are received.

20 Claims, 6 Drawing Sheets

RULE-BASED BINDING

BACKGROUND

Integrated development environments (IDEs) are designed to improve software programmer productivity by providing tightly-knit components (e.g., editors, compilers, debuggers) with similar graphical user interfaces. An IDE can be designed for developing applications in one or more programming languages, including visual programming languages. IDEs can also be designed for developing business processes or workflows. IDEs typically present an integrated graphical user interface in which all tasks are performed.

SUMMARY

In general, one aspect of the subject matter described in this specification can be embodied in methods that include the actions of receiving first input to a graphical user interface (GUI) associating a property of a data model presented in the GUI with a data view component of a document presented in the GUI, wherein a change to a value of the data view component is reflected in a value of the property for the data model when the document is used in a workflow, and wherein the workflow is a logical sequence of documents, including the document, that is processed according to the logical sequence such that values for one or more data view components associated with the documents are received, receiving second input to the GUI specifying an access mode attribute for the property, and generating a first rule having a first expression that specifies the access mode attribute of the property for user interaction with the document, wherein the access mode attribute specifies whether the value of the data view component can be modified when the document is used in the workflow. Other embodiments of this aspect include corresponding systems, apparatus, and computer programs, configured to perform the actions of the methods, encoded on computer storage devices.

These and other embodiments can each optionally include one or more of the following features. The first input can include a drag-and-drop operation from the property to the data view component, a user selection from a user interface component, a double-click or right-click mouse input, or input from a menu selection. The one or more aspects can also include receiving input specifying a second expression for the first rule wherein the second expression specifies at least one of a different access mode attribute and a different property of the data model. The one or more aspects can also include receiving input defining the first rule based on a second rule. At least one of the first and second rule can be used to invoke a web service wherein data received from the web service invocation populates values of one or more properties in the data model. The access mode attribute can include at least one of read-only, visible, and mandatory. The one or more aspects can also include presenting the document in a different GUI according to the logical sequence, receiving data for the value of the data view component according to the first rule, and updating the value of the property with the data.

In general, another aspect of the subject matter described in this specification can be embodied in methods that include receiving first input to a graphical user interface (GUI) associating a property of a data model presented in the GUI with a data view component of a document presented in the GUI, wherein a value received from a web service updates a value of the property, receiving second input to the GUI specifying an access mode attribute for the property, and generating a first rule having a first expression that specifies the access mode attribute of the property for user interaction with the document, wherein the access mode attribute specifies whether the value of the data view component can be modified when the document is used in the workflow. Other embodiments of this aspect include corresponding systems, apparatus, and computer programs, configured to perform the actions of the methods, encoded on computer storage devices.

These and other embodiments can each optionally include one or more of the following features. The first input can include a drag-and-drop operation from the property to the data view component, a user selection from a user interface component, a double-click or right-click mouse input, or input from a menu selection. The one or more aspects can also include receiving input specifying a second expression for the first rule wherein the second expression specifies at least one of a different access mode attribute and a different property of the data model. The one or more aspects can also include receiving input defining the first rule based on a second rule. The web service can be provided one or more arguments corresponding to one or more data model property values. The access mode attribute can include at least one of read-only, visible, and mandatory. The one or more aspects can also include presenting the document in a different GUI according to the logical sequence, receiving data for the value of the data view component according to the first rule, and updating the value of the property with the data.

Particular embodiments of the subject matter described in this specification can be implemented so as to realize one or more of the following advantages. Reducing/eliminating coding in the data model by providing mechanisms that can be used to bind of one or more data view components to data model properties through the use of graphical elements. The reduction/elimination of coding in the data model yields a more maintainable collection of documents as part of the workflow. As such, users of the system can generate logically rich documents as part of the workflow with little or no software programming experience. Furthermore, without the need for coding, solutions can be developed more rapidly, and with fewer errors.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
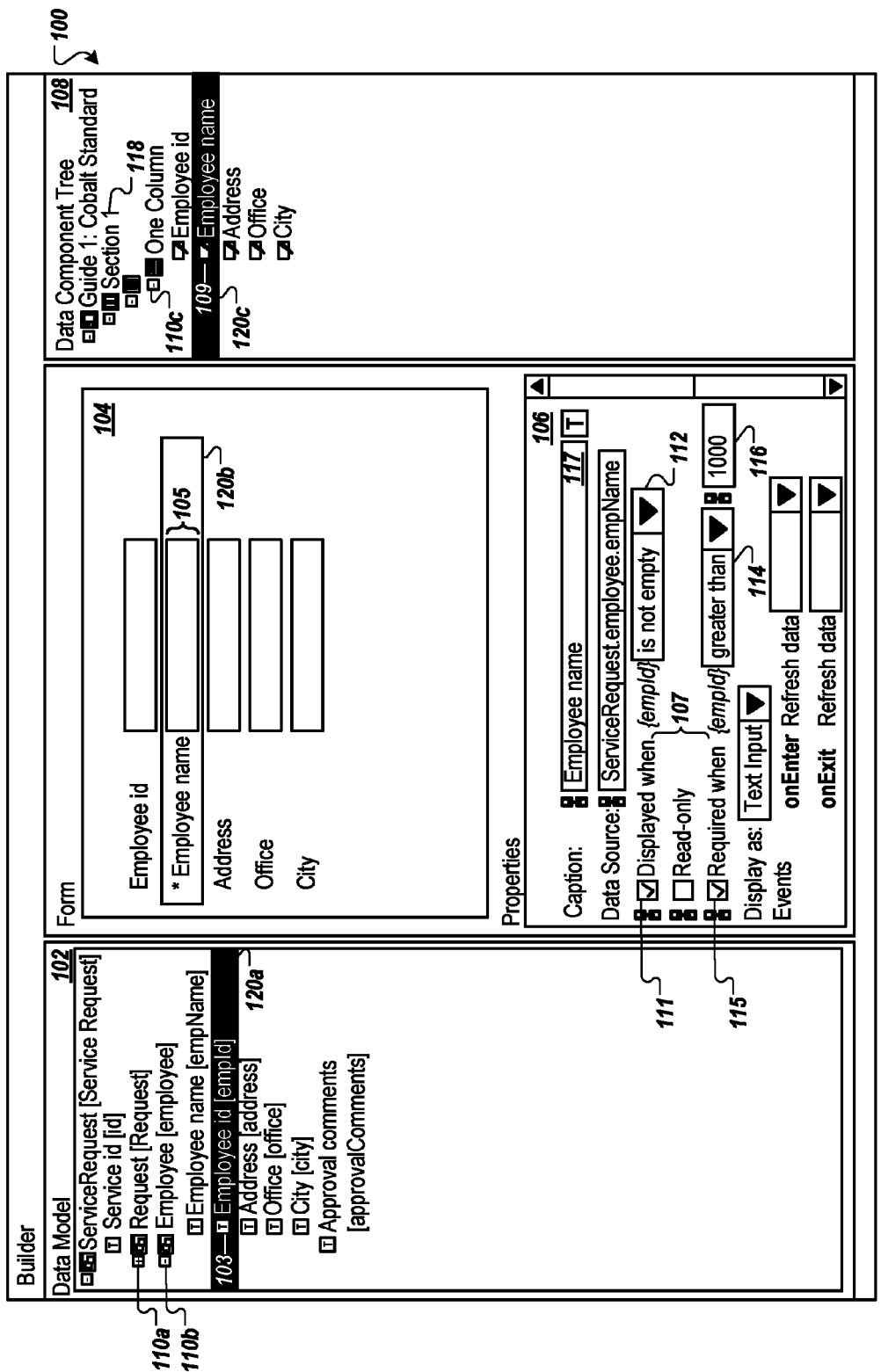
FIG. 1 is an example graphical user interface of a software application that can be used to define behaviors for one or more data view components in an electronic document as part of a workflow.

FIG. 1 is an example graphical user interface (GUI) 100 of a software application that can be used to define behaviors for one or more data view components in an electronic document as part of a workflow. In one implementation, the application is an integrated development environment (IDE), such as Adobe LiveCycle Process Management, available from Adobe Systems Incorporated of San Jose, Calif., to name one example. However, other IDEs or other types of applications can also be used. An electronic document (which for brevity will simply be referred to as a document) may, but need not, correspond to a file. The document may be stored in a portion of a file that holds other documents, in a single file dedicated to the document in question, or in multiple coordinated files. In some implementations, the document provides user interaction through a collection of one or more data view components. In one implementation, the document is a portable document format (PDF) document.

Data view components include editable and non-editable text fields, tab controls, text labels, buttons (e.g., radio buttons, check boxes, and other buttons), combo boxes, panels, list boxes, other imbedded documents, video players, audio players, and any other user interface component that provides user interactivity, data entry capabilities, or in any way presents information within the document to the user. Other data view components are possible. In some implementations, the user can interact with the data view components as presented in a GUI through any combination of voice input, keyboard input, mouse input, stylus input, touch screen input, or any other form of user input.

In general, a workflow provides a user or a process (e.g., a software application or other executing program logic) with a logical sequence of steps that allows the user to complete a task. The sequence of steps may, but need not be, a linear sequence. Workflows can include navigating a logical sequence of steps to enter a work order, purchase new equipment, hire new employees, manage payroll, or to perform any other task, for example. In some implementations, the steps of the workflow allow the user to navigate a logical sequence of documents, each document including one or more data view components, enter information, store that entered information in a data source in a manner that is consistent with a particular data model, modify the manner in which the workflow is presented, and combinations of these. In some implementation, the workflow is implemented in an IDE, such as the LiveCycle Process Management IDE, to name one example.

In general, the data model describes data organization, data formats, access protocols, or combinations of these. For example, a data model can describe how information is organized and, in some implementations, how data can be accessed, stored, or both in a data source that is structured in a manner consistent with the data model. Examples of data models include, but are not limited to, data models defined by database schema and extensible markup language (XML) schema, or other data model definitions. Examples of data sources include, but are not limited to, databases, web services, and other applications. In some implementations, the data model is stored as a collection of electronic documents. Web services are described in more detail below.

Referring back to the GUI 100 of FIG. 1, in some implementations, the GUI 100 is subdivided into multiple regions including a data model region 102, a preview region 104, a data binding region 106, and a playlist region 108. Other GUI configurations are also possible, however, including multiple GUIs. In some implementations, a playlist defines how a workflow is structured (by sections and panels), and the contents of the panels.

The data model region 102 can present information to a user according to the data stored in a data source, according to a description of the structure of the data model, or both. In some implementations, the data model reflects a database (e.g., Fiber, Access, Sybase, Oracle, and other databases). For example, the information presented in the data model region 102 can reflect the database according to the contents of the database, according to a description of the database (e.g., one or more database schema documents), or both. In some implementations (e.g., where the data model reflects a relational database), data objects of the model are analogous to tables of the database and the data properties of the model are analogous to fields of a particular database table. In some implementations, the data model is a so-called intelligent data model whereby the data model includes pre-defined capabilities including, but not limited to, automatically calculating one or more data model properties, automatically validating one or more data model properties, and automatically correcting one or more data model properties as one or more data model properties in the data model change. In some implementations, the data model may reflect a machine-to-machine interaction, such as the interactions captured by a web service which allows for machine-to-machine interactions over a network. In general, the web service provides an interface (e.g., an application program interface (API)) that can be used by an application or other executing program logic, which enables data to be exchanged during the machine-to-machine interactions.

For example, a data model for a weather web service that provides weather information could include data objects for each day of the week, and each data object may include data properties corresponding to a high temperature, a low temperature, precipitation information, and other weather related information. Each of the objects of the weather web service may be defined by one or more documents (e.g., one or more XML files), or collectively as a single document, that can be interpreted by the application to populate data model region 102. Furthermore, the weather web service can receive one or more parameters through the API that correspond to one or more properties in the data model. For example, an application can provide any of the high temperature, low temperature, precipitation information or other weather related information parameters to the weather web service through the API. As another example, the application can provide one or more days of the week as parameters to the weather web service through the API. In response, the weather web service can provide values for the one or more data model properties. For example, the weather web service can provide values for the high temperature, low temperature, precipitation information and other weather information corresponding to the received parameters, according to particular implementations. The values provided by the web service can be stored by the application in the data model and used in the documents as part of the workflow. For example, the application can store values provided by the weather web service (e.g., values corresponding to the high temperature, low temperature, precipitation information and other weather information data model properties) in the data model. However, other relationships between data objects, data properties, and the data model are also possible, depending on particular implementations. That is, the application can be configured to interpret the structure of any data model, regardless of whether the data model corresponds to a database, a web service, an application, or other data source and present the data model in the data model region 102.

In some implementations, the user may specify which data model the application utilizes. For example, the user may provide input to the GUI 100 that connects the application to a data model. In response, the application determines the characteristics of the data model and populates the data model region 102. For example, the application can interpret the schema contained in a XML document to populate the data model region 102 with information corresponding to a service request data object. Furthermore, a number of additional data objects and data properties that are associated with the presented service request data object may also be displayed in the data model region 102 of the GUI 100. For example, the service request data object includes a number of other properties including a service id and approval comments and a number of other data objects including a request data object and an employee data object.

Furthermore, as illustrated by the expandable user interface component 110a (e.g., the plus-sign) next to the request object, the request object includes a number of other data model properties which can be viewed by selecting the expandable user interface component 110a. In the depicted example, the expandable user interface component 110b has been selected for the employee data object revealing the employee data object's data properties, which include employee name, employee id, address, address, office, and city.

In some implementations, the data model region 102 can be used to create one or more data model objects, move or otherwise copy values between one or more data model properties, or combinations of these. For example, the data model region 102 can accept a right mouse click, or other input from a user. Furthermore, the user can choose to add a new data object (e.g., the user can select "Add Data Object" from a user interface component presented in response to receiving the right mouse click input). In response, the IDE can present a user interface form or other user interface component that allows the user to specify a service (e.g., a web service) that creates a data model property or a data model object (that contains the data model property). In some implementations, the service includes an "invokeCondition" routine that can also be associated with the data model as a rule. In some implementations, when the rule associated with the "invokeCondition" routine is true, one or more documents of the workflow can invoke the service which creates the appropriate data object or data model property in the data model.

Furthermore, in some implementations, the user can select "Add Binding" instead of "Add Data Object." In response, the IDE generates a form or other user interface component that allows a user to associate one or more data model properties with one or more other data model properties and assign the association to a rule. Moreover, when the rule is evaluated as true, the one or more documents of the workflow can copy the value from a first data model property or collection of data model properties to a second data model property or collection of data model properties in the data model. As such, the IDE can generate one or more documents that include logic typically performed using switch or case statements, or other similar logical constructs in program languages, without the user, application, process, or other executing program logic to generate the logic for those statements.

The preview region 104 presents a graphical representation of a document, including any data view components of the document that is part of the workflow. Each document can include any number of data view components. For example, as shown in FIG. 1, the preview region 104 displays a document corresponding to a user interface form that includes data view components corresponding to editable fields of the form. These editable fields can be populated with information from the data model. For example, the Employee id, Employee name, Address, Office, and City data view components correspond to the Employee id, Employee name, Address, Office, and City data properties, respectively, of the employee data object in the data model. That is, when a document includes these editable fields as part of a workflow, a change to any of the data view components in the document changes the respective data property value of the data model and vice versa. In some implementations, this allows the state of one or more tasks performed as part of the workflow to be persisted in the data model. For example, in some implementations, if a user stops navigating the sequence of documents as part of the workflow, the values of the data model properties reflect the portion of the sequence of documents that the user navigated. Later, if the user resumes navigating the sequence of documents, the values of the data model properties can be retrieved by the documents in the workflow, returning the documents to the state described by the data model properties stored in the data model at the time the user ceased navigation.

The data binding region 106 of the GUI 100 presents a graphical representation of one or more access mode attributes of the selected data view component. For example, as shown in FIG. 1, the data binding region 106 presents one or more access mode attributes 107 for the Employee id data view component 105. The access mode attributes 107 specify the access permissions for the data view component 105 when the document is used in a workflow. For example, the access mode attributes can specify when a data view component is read-only, visible in the document, mandatory, and combinations of these. For example, a mandatory access mode attribute for a data view component specifies that the value for the data view component must be provided to the document before a user can proceed to the next step in the workflow. In some implementations, the visible access mode attribute specifies that the data view component is displayed as part of the document. In some implementations, the read-only access mode attribute specifies that the data view component does not accept user input. In the depicted example of FIG. 1, the Employee name data view component 105 is displayed when the Employee id data model property 103 is not empty and is required (i.e., mandatory) when the Employee id data model property 103 is greater than 1000. In some implementations, the access mode attribute can specify a styling of the document. For example, the access mode attribute can specify a style that displays one or more portions of the document (e.g., text presented in one or more edit boxes, or other user interface components) as being bold and red. In further implementations, the access mode attributes can specify when a data view component is write-enabled, invisible, optional, and combinations of these, when the document containing the data view component is used in a workflow. For example, an invisible access mode attribute for a data view component hides the data view component from view during one or more steps of the workflow, only becoming visible based on one or more behaviors defined in the one or more documents as part of the workflow (e.g., by using techniques described herein). In some implementations, the write-enabled access mode attribute specifies that the data view component can accept user input. In some implementations, the optional access mode attribute specifies that the user does not need to specify a value for the data view component before proceeding to the next step of the workflow.

To create an association between data view components of a document with the data model properties, the application accepts one or more inputs. For example, in some implementations, a combination of keyboard inputs can be used to select the data view component and associate it with a data model property (or vice versa). In some implementations, the user can perform a drag-and-drop operation in the GUI 100 to create the association. For example, the user can drag the selected Employee id data model property 103 from the data model region 102 and drop the data model property 103 onto the "Displayed when" user interface portion 111 of the data binding region 106. Thereafter, the user can provide an additional input that specifies the access mode attribute. For example, the user can select "is empty" or "is not empty" from the drop-down user interface component 112 to specify the "Displayed when" access mode attribute. In some implementations, the application can accept input corresponding to a user selection from a user interface component (e.g., a list view or tree view component), from a double-click or right-click mouse input, from a menu selection, or from other inputs.

Moreover, the application can also generate a rule from the specified access mode attribute. For example, the application can generate a rule corresponding to any of the provided access mode attributes 107 that specifies the behavior of the data view component 105 in the document as part of the workflow. In some implementations, the binding region 106 represents a rule for the captioned data view component. For example, the binding region 106 represents a rule for the data view component 105, as specified by the user interface component 117. In various implementations, a rule comprises one or more expressions. An expression comprises a combination of one or more data model properties, rules, Boolean operators, relational operators, mathematical operators, and functions that are interpreted (evaluated) to produce a result. For example, the rule corresponding to the "Displayed when" user interface portion 111 can form the expression "if the data model property employee id is not empty, then display the data view component employee name," where the expression comprises a combination of the data model property "employee id," and a mathematical operator "is not empty" (e.g., not equal to false, zero, null, or other representations of empty), which is evaluated to produce the result of presenting the data view component 105 in the document. Other types of expressions are possible. In some implementations, the rule associated with the access mode attribute can specify a different type of user interface component to use to present the associated information. For example, the rule can specify that instead of presenting the employee name in the user interface component 105 (which happens to be an editable text field), the employee name should be presented in a table or other user interface component.

Furthermore, in some implementations, the user can provide additional input that specifies one or more additional results for the presented rule. That is, in some implementations, when the user specifies a second access mode attribute, another expression is added to the presented rule. For example, the user can perform another drag-and-drop operation to drag the employee id data model property 103 from the data model region 102 and drop the data model property 103 onto the "Required when" user interface portion 115 of the data binding region 106. Additionally, the user can specify a value for an expression corresponding to the "Required when" user interface components 114 and 116 (a combo-box and text field, respectively). In response, in some implementation, the application can generate the expression "if data model property employee id is greater than 1000, then the data view component employee name is mandatory," where the expression comprises a combination of the data model property "employee id," a mathematical operator "is greater than" and a numerical value "1000" which is evaluate to produce the result of changing the data view component 105 in the document to a mandatory data view component.

In some implementations, the optional playlist region 108 presents information regarding the workflow. For example, as illustrated by user interface component 118, the playlist region 108 presents information regarding a document "Section 1" as part of the workflow. Additionally, in some implementations, the playlist region 108 presents the data view components that are contained in the documents as playlist elements. For example, because the "One Column" expandable user interface component 110c is selected, the playlist region 108 presents the playlist elements Employee id, Employee name, Address, Office, and City which correspond to the respective data view components of the document.

Furthermore, in some implementations, the application may highlight one or more portions of the GUI 100 to provide a more intuitive user experience. For example, as shown in FIG. 1, highlights 120a, 120b, and 120c highlight the employee name in the data model region 102, the preview region 104, and the playlist region 108, respectively, which may intuitively provide some feedback to the user regarding what aspects of the documents for which they are defining behaviors. In some implementations, the application may highlight any of the employee name data model property 103, the employee name data view component 105, and the employee name playlist element 109 when a user selects a similar user interface component in a different region. That is, if the user selects any one of the employee name user interface components presented in the GUI (e.g., data model property 103 in the data model region 102, the employee name data view component 105 in the preview region 104, or the employee name playlist element 109 in the playlist region 108), the application may highlight all of the similar user interface components using highlights 120a-120c as illustrated in FIG. 1.

In addition to presenting one or more highlights, the selection of a data model property, a data view component, or a playlist element can cause the application to populate one or more portions of the GUI 100. For example, if the user selects data model property 103 or playlist element 109, then both the preview region 104 and the binding region 106 may be presented in a similar manner according to FIG. 1. Additional presentations of the GUI 100 are also possible according to different selections of user interface components presented in the GUI, however.

In some implementations, the association described in reference to FIG. 1, creates a bi-directional binding between the data model and the data view components. That is, changes to values of the data model are reflected by values of associated data view components, and vice versa. In some implementations, these bi-directional bindings are reflected as part of the workflow as one or more behaviors.

Figure 2:
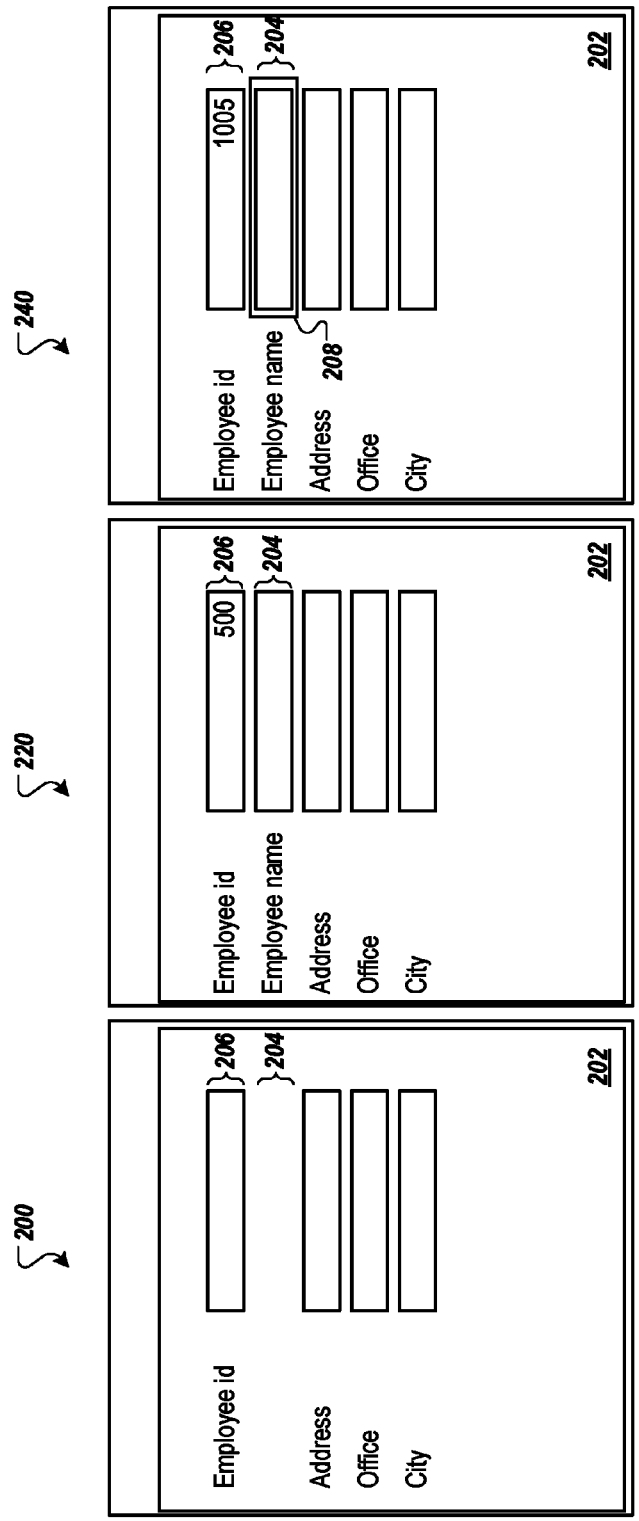
FIGS. 2A-2C are examples of a document in a workflow that incorporates the behaviors defined by the example graphical user interface of FIG. 1.

FIGS. 2A-2C are examples of a document 202 in a workflow (shown as workflow steps 200, 220, and 240) that incorporates the behaviors defined by the example graphical user interface of FIG. 1. For convenience, only a single document is shown (i.e., document 202), but it should be understood that the logical sequence may include any number of documents.

In the example depicted in FIG. 2A, the employee name data view component 204 of the document 202 is not visible. Recall that in reference to FIG. 1, a rule was created that hid the employee name data view component 204 from view until the employee id data model property is not empty. As such, because the employee id data view component 206 is empty (and as described above, because of the bi-direction nature of the association, the employee id data model property is also empty), the document 202 hides the employee name data component 204 from the user as part of the workflow. That is, the document 202 removes the data view component 204 from the user interface presented as part of the workflow. During the course of the workflow, as the data model changes (e.g., in response to receiving user input), the employee name data view component 204 may become visible (e.g., if the employee id data model property is not empty).

FIG. 2B illustrates a change in the document 202 when a value is received by the employee id data view component 206, according to the previously specified behaviors described in reference to FIG. 1. That is, in the depicted example, input is received by the employee id data view component 206 and, in response, the document 202 can store the value of the received input in the data model as the employee id data model property. As such, when the document 202 checks or is otherwise informed of a change to the data model, the document 202 can determine if the if-clause in the expression "if the data model property employee id is not empty, then display the data view component employee name," is true or false. For example, in some implementations, the document 202 can initialize one or more listeners that communicate with the data model and inform the document 202 when contents of the data model change. In some implementations, the listeners are event-driven interrupts (e.g., every time the value of the data model changes, the listener interrupts the document 202 and provides the one or more changes in the data model to the document 202).

In the depicted example of FIG. 2B, because the data model property employee id is not empty (and therefore the if-clause of the expression is true), the document 202 presents the employee name data view component 204. Furthermore, recall that in reference to FIG. 1, a second expression to the rule was added that designated the employee name data view component 204 as a mandatory component if the employee id is greater than 1000. As such, the document 202 also checks the data model to determine if the if-clause in the second expression "if the data model property employee id is greater than 1000, then the data view component employee name is mandatory," is true or false. In the depicted example of FIG. 2B, the second expression evaluates to false (because the employee id is not greater than 1000) and therefore, the employee name data view component 204 is not a mandatory data view component in the document 202 as part of the workflow.

FIG. 2C illustrates a change in the document 202 when the value that is entered into the employee id data view component 206 is greater than 1000, according to the previously specified behaviors described in reference to FIG. 1. As described in reference to FIG. 2B, the document 202 can store the value of the received input in the data model as the employee id data model property. Again, the document 202 checks the data model to determine if the if-clause in the second expression "if data property employee id is greater than 1000, then the data view component employee name is mandatory," is true or false. In the depicted example of FIG. 2C, the second expression evaluates to true (because the employee id is greater than 1000) and therefore, the employee name data view component 204 is a mandatory data view component in the document 202 (e.g., as illustrated by the additional user interface component 208 that highlights the editable field of the employee name data view component 204) as part of the workflow. In some implementations, when a data view component is mandatory, it changes the behavior of the workflow. For example, if a data view component is mandatory, the mandatory data view component must receive input (e.g., from a user, or other process) before the workflow may proceed (e.g., present one or more additional documents, perform any additional tasks, communicate with the data model, or combinations thereof).

Figure 3:
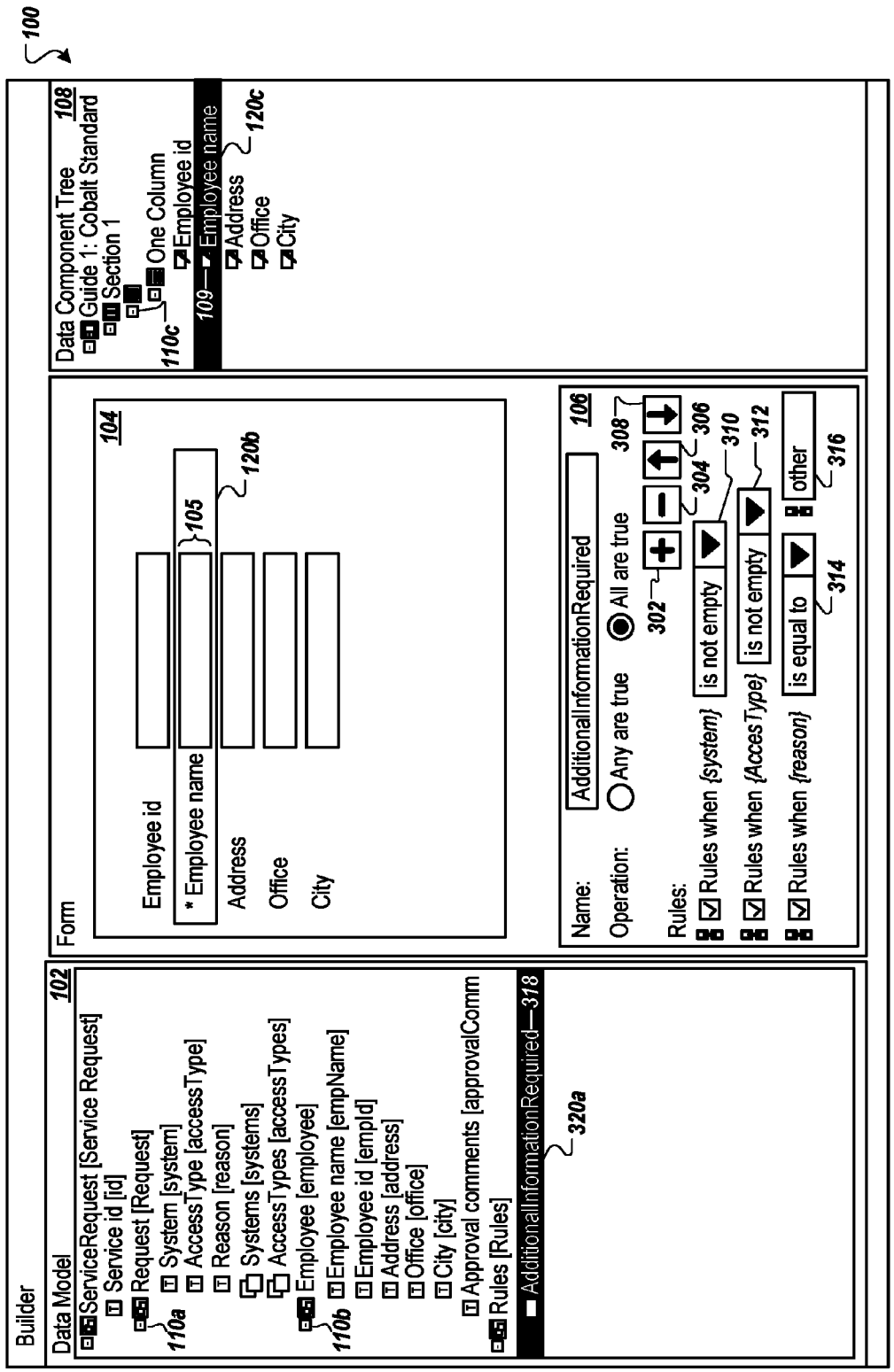
FIG. 3 is an example graphical user interface of an application that can present a created rule that can be used in a document as part of a workflow.

FIG. 3 is an example graphical user interface of an application that can present a created rule that can be used in a document as part of a workflow. In addition to the association and rule generation described in reference to FIG. 1, the application can also store the rules in the data model and allows the rules stored in the data model to be associated with data view components in a similar manner to data model properties.

For example, in the depicted example, the data model region 102 includes a defined rule 318 titled "AdditionalInformationRequired" that has been stored according to a previous operation. The "AdditionalInformationRequired" rule returns a Boolean value which can be bound to a property in a property page and as such, it can also be bound to properties such as "Visible" property in a panel or a panel item. Operations that can be used to create and store rules in the data model are discussed in more detail below. In some implementations, the binding region 106 presents the rule 318 according to the information stored in the data model. For example, the user can modify one or more of the parameters of rule 318 according to user interface components 310-316 which specify one or more expressions of the rule. Furthermore, the binding region 106 also includes user interface components 302-308 which can be used to modify the evaluation of one or more expressions contained in the rule.

User interface component 302 provides a mechanism to add additional expressions, rules, or both. For example, when user interface component 302 is selected, the application can present a user interface that allows the user to add one or more rules to the currently selected rule. For example, the application can present a GUI that allows the user to add one or more rules. An example GUI is described in more detail below. User interface component 304 can be used to remove an expression, rule, or both from the binding region 106. For example, if the user selects user interface component 304 and then selects one of the rules presented in the binding region 106, that selected rule is removed from the binding region 106. In addition, in some implementations, the rule or expression is removed from the data model. User interface components 306 and 308 can be used to reorder the evaluation of the selected rule or expression. For example, user interface component 306 can move the rule up in evaluation order when selected while user interface component 308 can move the rule down in evaluation order when selected.

To associate a rule or expression with a data view component, the user can perform similar operations described in reference to FIG. 1 for associating data model properties to data view components. That is, in some implementations, the user can perform drag-and-drop operations to drag the rule into the binding region 106, and drop the rule into place, creating very robust workflows. For example, because behaviors can be associated with the documents of the workflow according to data model properties, rules, or combinations thereof, the user can generate logically-rich documents as part of the workflow with minimal effort.

FIGS. 4A-4D are screenshots 400-406 of an example GUI 408 that can be used to create a plurality of rules and compound rules. In some implementations, the GUI 408 is a form that is presented as part of the application. For example, in some implementations, the GUI 408 can be presented to a user after the application receives input corresponding to the user interface component 302 being selected.

The GUI 408 shares many common elements between the different screenshots 400-406. In particular, the GUI 408 includes user interface components 410, 412, 414, 416. In addition, in some implementations, the GUI 408 may include any number of user interface components 418 (e.g., as illustrated as user interface components 418a-418c), any number of user interface components 420 (e.g., as illustrated as user interface components 420a-420c), any number of user interface components 422 (e.g., as illustrated as user interface components 422a-422c), any number of user interface components 424 (e.g., as illustrated as user interface components 424a-424c), and any number of user interface components 426 (e.g., as illustrated as user interface components 426a-426c), depending on particular implementations. In the depicted examples of screenshots 400-406, user interface components 410-426 are shown as being a particular type of user interface component (e.g., user interface components 412 and 414 are shown as radio buttons). However, it should be understood that user interface components 410-426 may be selected from a variety of different user interface components depending on particular implementations (e.g., user interface component 412 and 414 may be a check box, button, or other user interface component).

User interface component 416 provides a mechanism for the user to specify or modify the name of a rule. For example, in screenshot 402, the user has provided input to user interface component 416 specifying that the name of the rule is "R1."

User interface components 412 and 414 specify how the rule is resolved. For example, if user interface component 412 is selected, then all of the rule's expressions are logically and-ed together (i.e., for the rule to be resolved as true, all of the expressions of the rule must be true). Conversely, if user interface component 414 is selected, then all of the rule's expressions are logically or-ed together (i.e., for the rule to be resolved as true, only one of the expressions of the rule must be true).

User interface component 422 presents which data model property is being compared to form the rule. In some implementations, the user interface component 422 is a read-only text label, but other presentations of user interface components 422 are also possible.

User interface component 424 allows a user to specify a logical operand. For example the user can specify, "is empty," "not empty," "greater than," "less than," is "equals," "not equals," "greater than or equals," "less than or equals," "AND" "OR," and other logical operands and their equivalents. User interface component 426 allows a user to specify a value that is compared to the logical operand selected in user interface component 424.

User interface component 420 presents information related to the association state (also known as a binding state) of the rule (e.g., if or to what a data view component is bound to). For example, the user interface component can present a chain to show an intact binding or a broken chain (e.g., a chain that has a red 'x' through it) to show a broken binding. Other presentations are also possible to present the binding state of the rule.

User interface component 410 allows a user to add additional rules to the GUI 408. For example, if the user selects user interface component 410, the application may add any of the user interface components 418-426, depending on particular implementations. User interface component 418 allows a user to remove a rule from the GUI 408. For example, if a user were to select user interface component 418a, the application may remove any of the user interface components 420a-426a, depending on particular implementations.

Figure 4A:
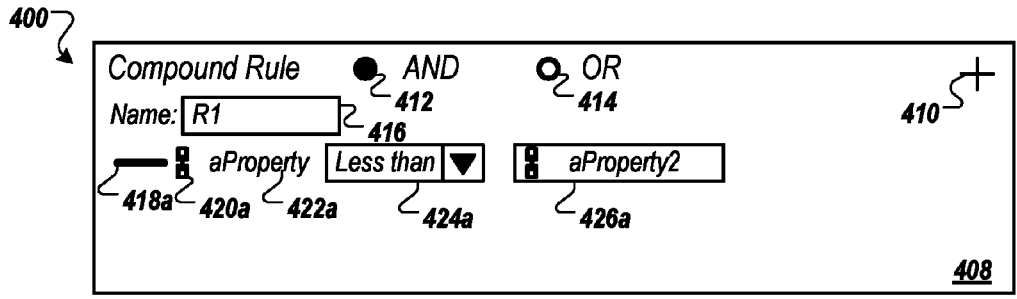
FIGS. 4A-4D are examples of a graphical user interface of an application that can be used to create any number of rules and compound rules.

In FIG. 4A, screenshot 400 illustrates generating a rule by comparing one data model property to a different data model property. In the depicted example, rule "R1" is evaluated as true if the data model property "aProperty" is less than the data model property "aProperty2." Alternatively, rule "R1" is evaluated as false if the data model property "aProperty" is greater than or equal to the data model property "aProperty2." In some implementations, an evaluation of true is analogous to the "not empty" logical operand. That is, in some implementations, when a rule is evaluated as true, the data model receives a value for the evaluated rule. Additionally, in some implementations, when a rule is evaluated as false, the data model does not receive a value for the evaluated rule.

Figure 4B:
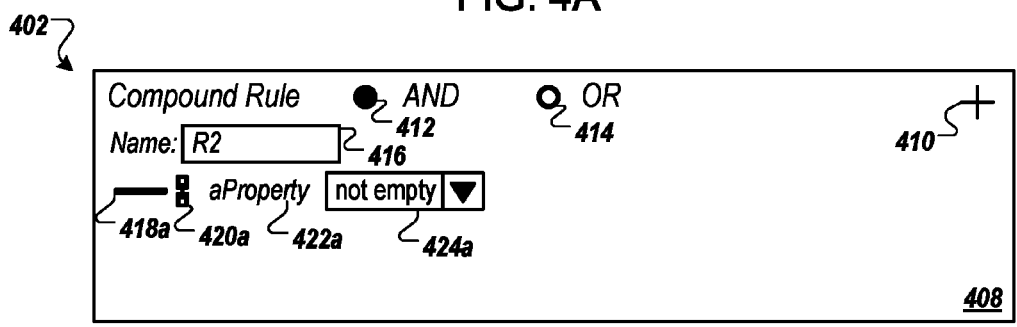

In FIG. 4B, screenshot 402 illustrates generating a rule by comparing one data model property to a logical operand. In the depicted example, rule "R2" is evaluated as true if the data model "aProperty" is not empty. Alternatively, rule "R2" is evaluated as false if "aProperty" is empty.

Figure 4C:
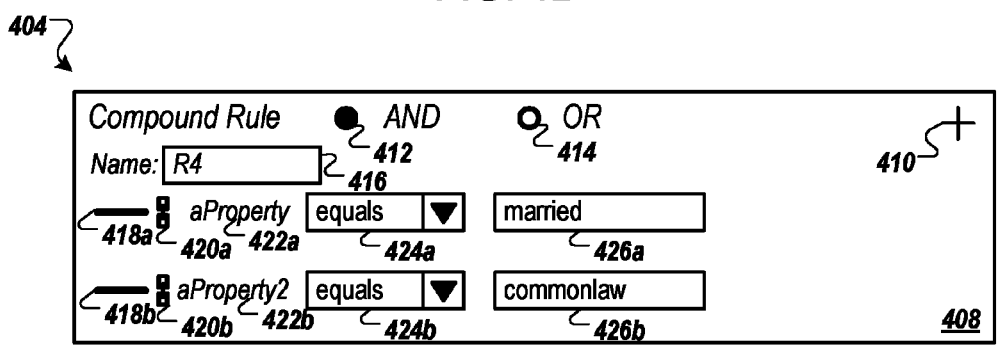

In FIG. 4C, screenshot 404 illustrates aggregating two expressions to generate a rule. In the depicted example, rule "R4" is evaluated as true if both the data model property "aProperty" equals the value "marriage" and data model property "aProperty2" equals the value "commonlaw." That is, because user interface component 412 is selected, both of the expressions must be true for rule "R4" to be evaluated as true. Furthermore, in some implementations, the values of 426a and 426b (i.e., "marriage" and "commonlaw," respectively) may be provided by a user, provide by the data model, or provided in some other manner (e.g., from another application or executing program logic). Additionally, in some implementations, user interface components 426a and 426b may be a dropdown box or other user interface component.

Figure 4D:
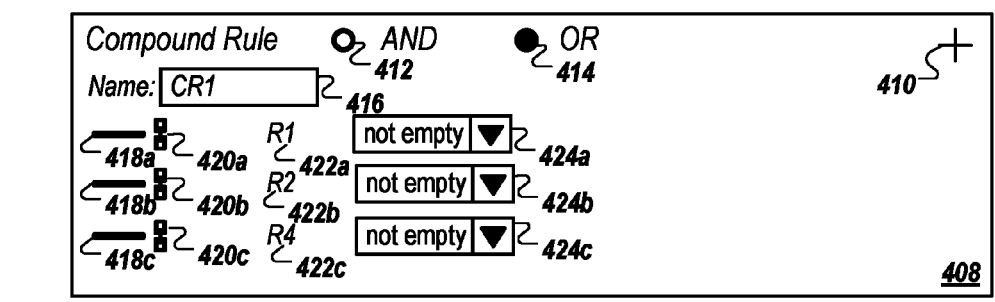

In FIG. 4D, screenshot 406 illustrates generating a rule that includes other rules (i.e., a compound rule). In the depicted example, compound rule "CR1" is a combination of rules "R1," "R2," and "R4." As described previously, when an "is empty" or "not empty" operand is associated with a rule, it is analogous to evaluating the rule as false or true, respectively. That is, in the depicted example, compound rule "CR1" is true if any of rules "R1," "R2," and "R4" are true. That is, because user interface component 414 is selected, only one of rules "R1," "R2," and "R4" needs to be not empty in the data model (i.e., true) for the compound rule to be evaluated as true. Alternatively, compound rule "CR1" is false if all of the rules "R1," "R2," and "R4" are empty in the data model.

In some implementations, GUI 408 may present additional user interface components or fewer user interface components. For example, in addition to user interface components 412 and 414, GUI 408 may include user interface components corresponding to an exclusive OR (i.e., XOR), or other user interface components.

Figure 5:
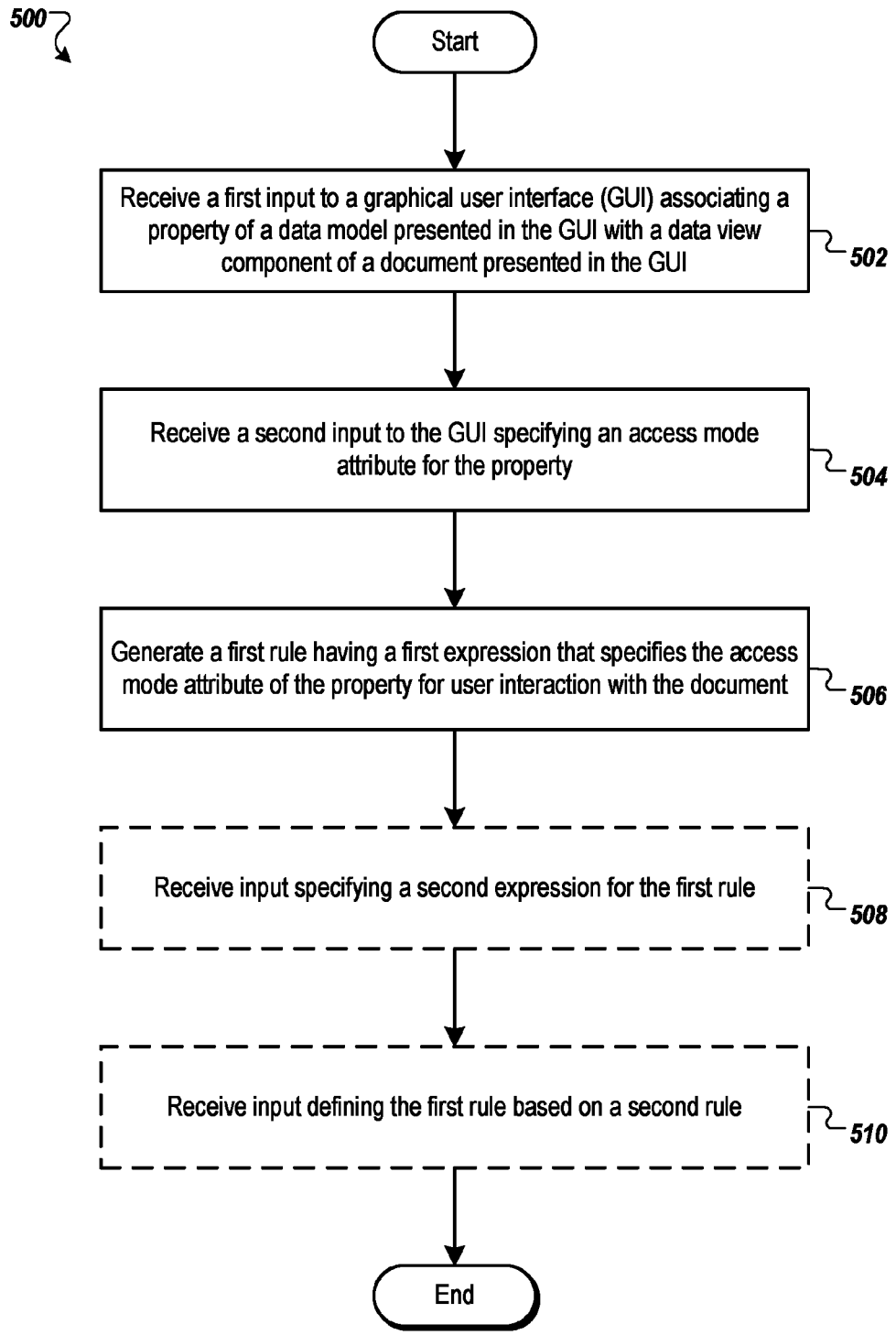
FIG. 5 is a flow chart of an example process that can be used to define behaviors for one or more data view components in document as apart of a workflow.

FIG. 5 is a flow chart of an example process 500 that can be used to define behaviors for one or more data view components in a workflow. For convenience, process 500 is described in reference to FIG. 1, FIGS., 2A-2C, FIGS. 4A-4D, and a system that performs process 500.

In step 502, the system receives a first input to a GUI associating a property of a data model presented in the GUI with a data view component of a document presented in the GUI. In the example of FIG. 1, the system receives an input corresponding to a drag-and-drop operation that drags the data model property 103 and drops the data model property onto user interface component 111 of the GUI. That is, the drag-and-drop operation can specify the data model property and the data view component that are associated according to from where the data model property was dragged, and where on the GUI that the data model property was dropped.

Furthermore, in some implementations, a change to a value of the data view component is reflected in a value of the property in the data model when the document is used in a workflow. For example, in reference to FIGS. 2A-2C, the value of data view component 206 is stored in the data model as the value of the data view component 206 changes according to the workflow steps 200-240.

In step 504, the system receives a second input to the GUI specifying an access mode attribute for the property. For example, in reference to FIG. 1, the system receives an input corresponding to a user selection of "is not empty" in the user interface component 112.

In step 506, the system generates a first rule having a first expression that specifies the access mode attribute of the property for user interaction with the document. For example, as described above, the system can generate a rule having an expression "if the data model property employee id is not empty, then display the data view component employee name." Moreover, the expression specifies the access mode attribute for "Displayed when" of the document according to the contents of the data model property employee id.

Furthermore, in some implementations, the access mode attribute specifies whether the value of the data view component can be modified when the document is used in the workflow. For example, in reference to FIGS. 1 and 2A-2C, the access mode attributes "Displayed when" specifies when the data view component 204 is displayed (and by extension when the value of the data view component 204 can be modified because the value cannot be modified when the component 204 is hidden from view) as part of the workflow.

In step 508, the system optionally receives input specifying a second expression for the first rule. In some implementations, the expression specifies either a different access mode attribute or a different property in the data model for user interaction with the document. For example, in reference to FIG. 1, the application receives another drag-and-drop operation (e.g., dragging the employee id data model property 103 onto the user interface component 115) that specifies an expression for the "Required when" access mode attribute according to values provided by the user using user interface components 114 and 116.

In step 510, the system optionally receives input defining the first rule based on a second rule. For example, in reference to FIG. 4D, the rule "CR1" is based on the rules "R1," "R2," and "R4." Additionally, in some implementations, any of the rules can be used to invoke a web service. For example, as described in reference to FIG. 1, the first or second rule can invoke a weather web service by providing one or more values to the web service through the weather web service API. Furthermore, in some implementations, data received from the web service invocation populates values of one or more properties in the data model. For example, data received from the weather web service can be used by the application to populate one or more values of one or more properties in the data model corresponding to the high temperature, the low temperature, precipitation information, and other weather information for one or more days of the week. That is, the application can receive data from the weather web service through the API, and store the received data as values for one or more data model properties in the data model.

Figure 6:
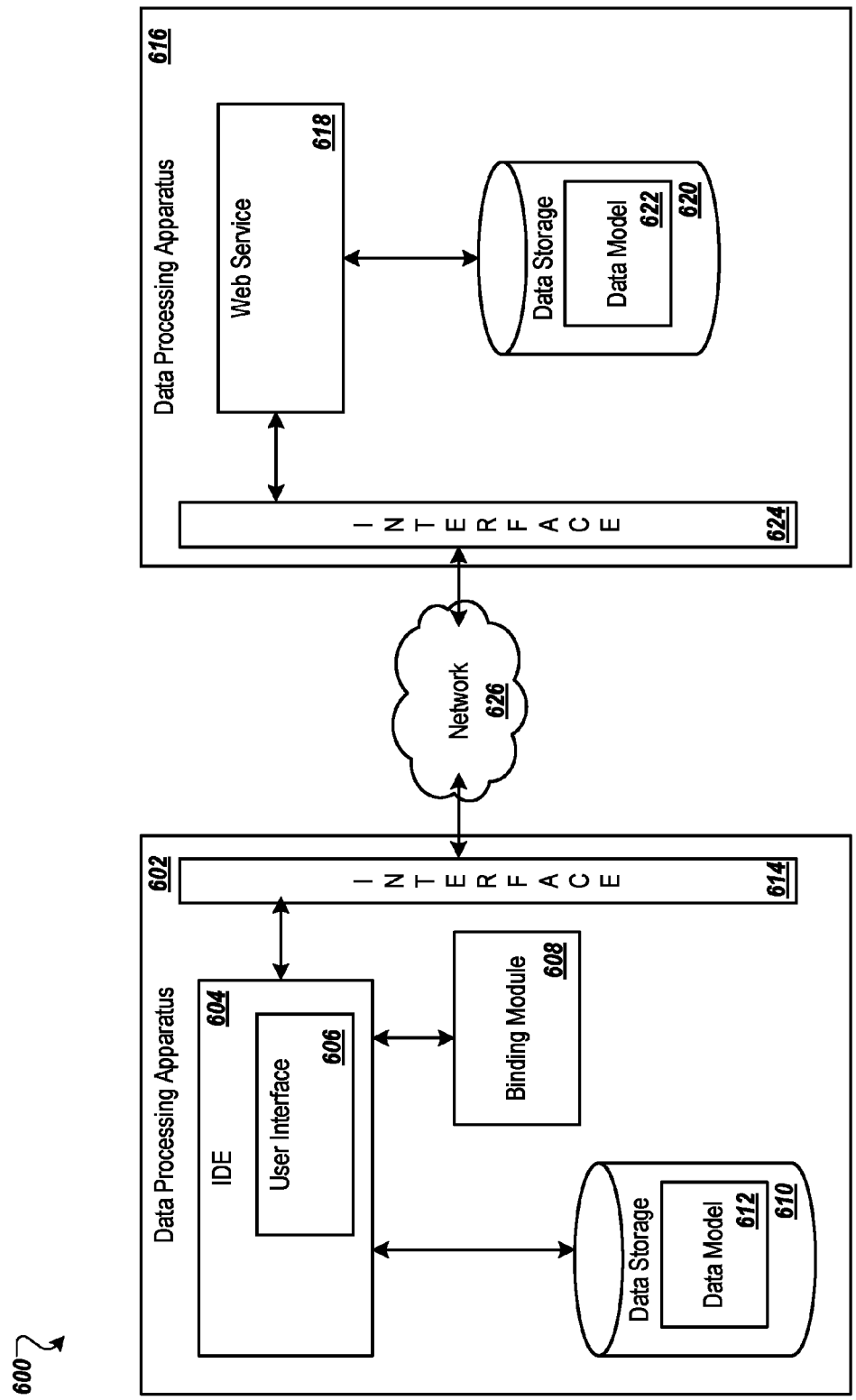
FIG. 6 is a block diagram of an example data processing apparatus that can be used to define behaviors for one or more data view components in a document as part of a workflow.

FIG. 6 is a block diagram of an example data processing system 600 that can be used to define behaviors for one or more data view components in a workflow. For convenience, the data processing system includes a first data processing apparatus 602 and a second data processing apparatus 616.

However, in some implementations, the data processing system 600 can include any number of data processing apparatus, with different configurations than those shown in the example.

In reference to FIG. 1, data processing apparatus 602 may be used to implement the processes and techniques described above. In some implementations, the data processing apparatus 602 includes, an IDE 604, a user interface 606, a binding module 608, data storage 610 (which includes a definition of a data model 612), and an interface 614.

As described above, in some implementations, the application may communicate with a web service available on another data processing apparatus over a network. Data processing apparatus 616 may be used to provide one or more web services 618 to the data processing apparatus 602 over a network 626. The data processing apparatus 616 includes a web service 618, data storage 620 (which includes a definition of a data model 622), and an interface 624.

For convenience, data processing apparatus 602 is shown with only one of an IDE 604, a user interface 606, a binding module 608, a data storage 610, a data model 612, and an interface 614 while data processing apparatus 616 is shown with only one of a web service 618, a data storage 620, a data model 622, and an interface 624. However, it should be understood that data processing apparatus 602 and 616 may include any number of these features, or other features according to particular implementations. Additionally, for brevity, certain similar features of data processing apparatus 602 and 616 are described as being similar, but other features are possible.

In some implementations, the IDE 604 can be used to generate one or more behaviors for one or more data view components in one or more documents as part of a workflow. The IDE 604 also includes a user interface 606. In some implementations, the user interface 606 is one or more of the GUIs 100, 202 and 408, described in connection with FIGS. 1-4, however, other user interfaces are possible. Furthermore, the IDE 604 can communicate with binding module 608, data storage 610, and interface 614. For example, in reference to FIG. 1, when the IDE 604 populates that data model region 102 in the user interface 606, the application 604 can communicate with the data storage 610 to retrieve the description of the data model 612. As another example, in reference to FIG. 1, when the application processes a drag-and-drop operation, it may provide the data view component, the data model property, or both, to the binding module 608 to generate an association between the two, a rule corresponding to the association, or both.

Binding module 608 can generate associations between data model properties, and data view components, documents, rules, or combinations of these. In some implementations, these associations specify one or more behaviors of one or more data view components, one or more documents, or both, as part of a workflow. For example, in reference to the operations described in FIG. 1, the binding module 608 may generate a rule corresponding to the expression "if the data model property employee id is not empty, then display the data view component employee name." Furthermore, in some implementations, the binding module can be used to generate a rule with more than one expression. For example, in reference to the operations described in FIG. 1, the binding module may generate a rule corresponding to the expression "if the data model property employee id is not empty, then display the data view component employee name and if data property employee id is greater than 1000, then the data view component employee name is mandatory," according to the received input described in reference to FIG. 1. Additionally, the binding module 608 can communicate with the IDE 604 to provide the generated rules, associations, or both.

In some implementations, the service 618 is a web service. In some implementations, values are provided to the web service in one or more data structures specified by the API of the web service. Furthermore, in some implementations, values are received from the web service in one or more data structures also specified by the API of the web service. For example, consider the weather web service described above. An application or other executing program logic can provide a day of the week using the API to the weather web service. In response, the application can receive one or more data structures containing information regarding high temperature, low temperature, precipitation information, and other weather related information from the weather web service through the API.

Additionally, the web service 618 can communicate with data storage 620 and the interface 624. For example, consider an implementation where the web service 618 is the weather web service described above. In such an implementation, the weather web service can retrieve information from the data storage 620 corresponding to the high temperature, the low temperature, precipitation information, and other weather information for one or more days of the week. Furthermore the weather web service can communicate that information to other applications and data processing apparatus over network 626 through interface 624. As such, applications in communication with the web service 618 can receive information contained in data storage 620. In some implementations, the information received from a web service 618 is received in response to a request from an application or executing program logic. For example, an application that presents one or more documents as part of a workflow may request weather information from the weather web service. That is, the application may communicate using network 626 to provide information to the weather web service and receive weather information from the weather web service using interface 624 and network 626.

The data storage 610 and 620 can be any variety of computer-readable storage including a hard drive, memory (e.g., read-only memory (ROM), random access memory (RAM), or other memory), or any other computer-readable storage. In the depicted example, the data storage 610 and 620 includes a description of data models 612 and 622, respectively. In some implementations, the description of data models 612 and 622 is an XML file or other structural description of the data models 612 and 622 (e.g., a collection of database schema).

The interfaces 614 and 624 can comprise software (e.g., a communication protocol), hardware (e.g., an Ethernet card), or combinations of these. The interfaces 614 and 624 allow the data processing apparatus 602 and 616, respectively, to communicate with other data processing apparatus (e.g., another of data processing apparatus 602 or data processing apparatus 616, or both). For example, the interfaces 614 and 624 allow the data processing apparatus 602 and 616, respectively, to communicate over the network 626 allowing, in some implementations, data processing apparatus 602 to retrieve information corresponding to the data model 622 of the service 618 running on data processing apparatus 616.

Network 626 is any network that can facilitate communications between data processing apparatus 602 and 616. Examples include local area networks (LANs) and wide area networks (WANS) such as intranets, and The Internet, respectively. In general, network 626 implements a communication protocol (e.g., Transmission Control Protocol/Internet Protocol (TCP/IP), User Datagram Protocol (UDP), and other protocols) to exchange data between two or more sources (e.g., any of the application 604, the data storage 610, the service 618, the data storage 620, or any other sources on data processing apparatus 602 and 616).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus (e.g., personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device).

Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving first input to a graphical user interface (GUI) associating a property of a data model presented in the GUI with a data view component of a document presented in the GUI,
      wherein the data view component is a user interface element configured to receive a value and apply the received value to the property associated therewith when the document is used in a workflow, and
      wherein the workflow is a logical sequence of documents, including the document, that is processed according to the logical sequence such that values for one or more data view components associated with the documents are received;
   receiving second input to the GUI specifying an access mode attribute for the property; and
   generating a first rule having a first expression that specifies the access mode attribute of the property for user interaction with the document, wherein the access mode attribute defines a restriction on how the data view component is configured to receive a value when the document is used in the workflow.

2. The method of claim 1 wherein the first input is a drag-and-drop operation from the property to the data view component, a user selection from a user interface component, a double-click or right-click mouse input, or input from a menu selection.

3. The method of claim 1, further comprising receiving third input specifying a second expression for the first rule wherein the second expression specifies a second access mode attribute.

4. The method of claim 1, further comprising receiving third input defining the first rule based on a second rule.

5. The method of claim 4 wherein at least one of the first and second rules is used to invoke a web service wherein data received from the web service invocation populates values of one or more properties in the data model.

6. The method of claim 1 wherein the access mode attribute is at least one of read-only, visible, and mandatory.

7. The method of claim 1, further comprising:
presenting the document in a different GUI according to the logical sequence;
receiving data for the value of the data view component according to the first rule; and
updating the value of the property with the data.

8. A computer program product, encoded on a non-transitory computer-readable medium, operable to cause a computer processor to perform operations comprising:
receiving first input to a graphical user interface (GUI) associating a property of a data model presented in the GUI with a data view component of a document presented in the GUI,
wherein the data view component is a user interface element configured to receive a value and apply the received value to the property associated therewith when the document is used in a workflow, and
wherein the workflow is a logical sequence of documents, including the document, that is processed according to the logical sequence such that values for one or more data view components associated with the documents are received;
receiving second input to the GUI specifying an access mode attribute for the property; and
generating a first rule having a first expression that specifies the access mode attribute of the property for user interaction with the document, wherein the access mode attribute defines a restriction on how the data view component is configured to receive a value when the document is used in the workflow.

9. The computer program product of claim 8 wherein the first input is a drag-and-drop operation from the property to the data view component, a user selection from a user interface component, a double-click or right-click mouse input, or input from a menu selection.

10. The computer program product of claim 8, further including operations comprising:
receiving third input specifying a second expression for the first rule wherein the second expression specifies a second access mode attribute.

11. The computer program product of claim 8, further including operations comprising:
receiving third input defining the first rule based on a second rule.

12. The computer program product of claim 11 wherein at least one of the first and second rules is used to invoke a web service wherein data received from the web service invocation populates values of one or more properties in the data model.

13. The computer program product of claim 8, further including operations comprising:
presenting the document in a different GUI according to the logical sequence;
receiving data for the value of the data view component according to the first rule; and
updating the value of the property with the data.

14. A system comprising:
a display device;
a machine-readable storage device including a program product; and
a processor operable to execute the program product, interact with the display device, and perform operations comprising:
receiving first input to a graphical user interface (GUI) associating a property of a data model presented in the GUI with a data view component of a document presented in the GUI, wherein the data view component is a user interface element configured to receive a value from a web service and apply the received value to the property associated therewith when the document is used in a workflow;
receiving second input to the GUI specifying an access mode attribute for the property; and
generating a first rule having a first expression that specifies the access mode attribute of the property for user interaction with the document, wherein the access mode attribute defines a restriction on how the data view component is configured to receive a value when the document is used in the workflow.

15. The system of claim 14 wherein the first input is a drag-and-drop operation from the property to the data view component, a user selection from a user interface component, a double-click or right-click mouse input, or input from a menu selection.

16. The system of claim 14, further including operations comprising:
receiving third input specifying a second expression for the first rule wherein the second expression specifies a second access mode attribute.

17. The system of claim 14, further including operations comprising:
receiving third input defining the first rule based on a second rule.

18. The system of claim 14 wherein the access mode attribute is at least one of read-only, visible, and mandatory.

19. The system of claim 14 wherein the web service is provided one or more arguments corresponding to one or more data model property values.

20. The system of claim 14, further including operations comprising:
presenting the document in a different GUI according to the logical sequence;
receiving data for the value of the data view component according to the first rule; and
updating the value of the property-with the data.

* * * * *